May 9, 1939.  C. E. CALLAWAY  2,157,998
TRAILER HITCH
Filed June 20, 1938
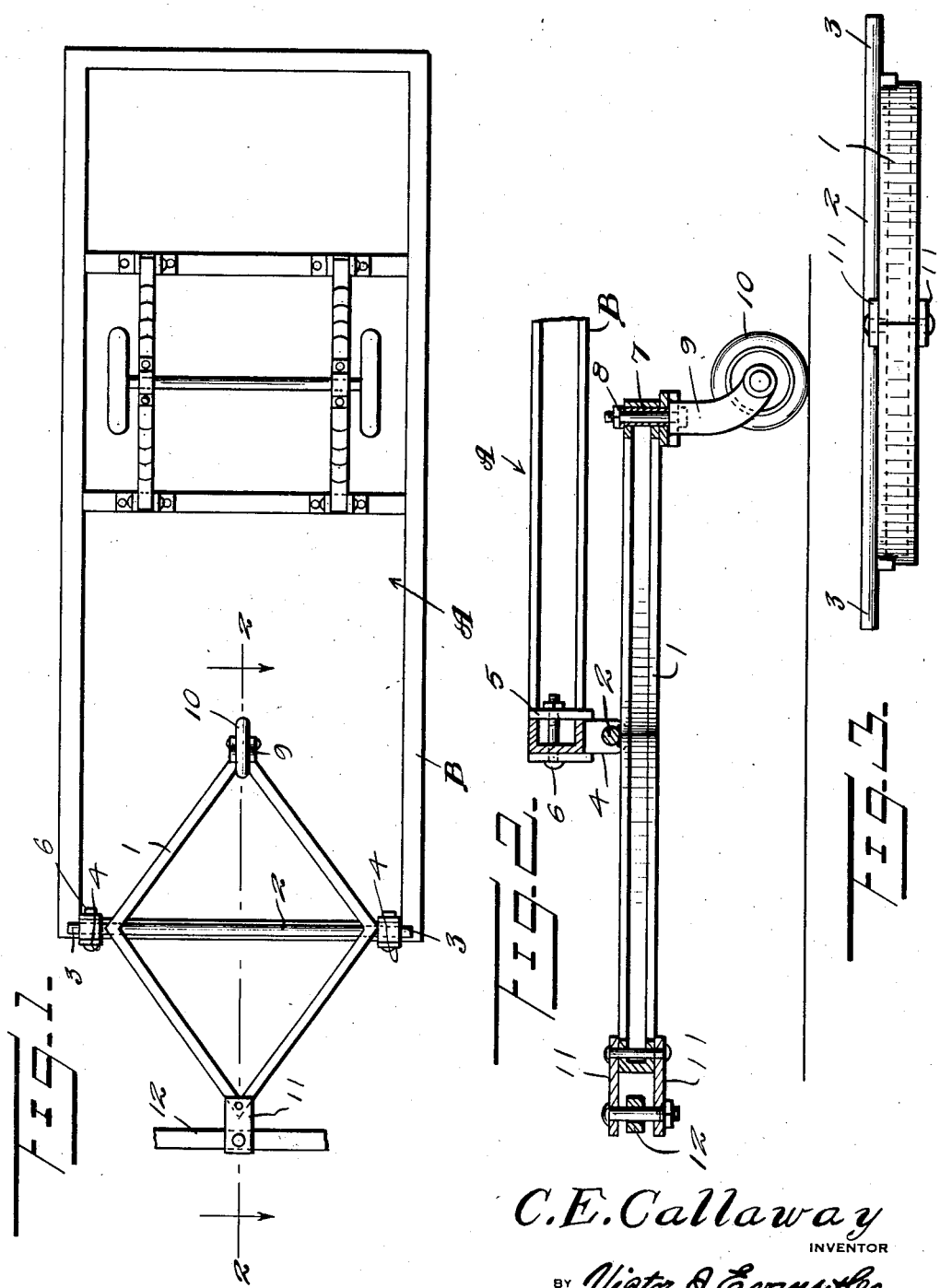
C. E. Callaway
INVENTOR
BY Victor J. Evans & Co.
ATTORNEYS Patented May 9, 1939

2,157,998

UNITED STATES PATENT OFFICE 2,157,998

TRAILER HITCH

Coleman E. Callaway, Wichita Falls, Tex.

Application June 20, 1938, Serial No. 214,794

1 Claim. (Cl. 280—33.2)

This invention relates to trailer hitches, and its general object is to provide a hitch that is primarily designed for use with two wheel trailers, to materially eliminate rebound thereof and therefore the jerking action that results therefrom, in that my hitch is rockably mounted between its ends to the sides of the trailer and extends beneath the latter, with a ground engaging caster wheel at its rear end, so that the load of the front end of the trailer is equally divided between the towing vehicle and the caster wheel.

A further object is to provide a trailer hitch of the character set forth, that can be readily applied to trailers now in general use, with minimum or no change to the structure thereof, is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a bottom plan view illustrating my trailer hitch applied to a trailer.

Figure 2 is a sectional view taken approximately on line 2—2 of Figure 1, looking in the direction of the arrows.

Figure 3 is a front view of the hitch.

Referring to the drawing in detail, the letter A indicates a trailer of the usual two wheel type, and which includes a base frame B.

The hitch which forms the subject matter of the present invention includes a diamond-shaped frame 1 that provides the body therefor, and welded or otherwise secured to the frame 1 at the inner ends of the arms thereof to bridge the same along its transverse axis, is a shaft 2 that extends beyond the frame to provide trunnions 3.

The frame 1 is attached to the base frame B through the instrumentality of bearing brackets 4 that have bearing openings to receive the trunnions 3 and U-shaped portions 5 with openings in the arms thereof to receive bolt and nut connections 6, the bolts extending through the base frame B for securing the brackets thereto, at the ends of the front portion of the frame B, as clearly shown in Figure 1, and the U-shaped portions are preferably of a size to snugly fit the frame B, as shown in Figure 2.

By connecting the frame 1 to the trailer in the manner as above set forth, it extends a considerable distance beneath the trailer, or in other words one-half of the frame is below the trailer while the other half extends forwardly from the front end thereof, and it will be apparent that the frame is rockably mounted with respect to the trailer.

The frame 1 is preferably made from channel iron as shown, and extending through the rear apex thereof is a bearing sleeve or bushing 7 having mounted therein a bolt and nut connection 8 that extends through the bight portion of the U-fork 9 for a caster wheel 10, the bight portion being engageable with a bearing plate on the underside of the frame 1, as shown in Figure 2.

Pivotally secured to the forward apex of the frame 1 are clevis plates 10 for connection with the hitch bar 12 of the towing vehicle, by a bolt and nut connection as shown.

From the above description and disclosure of the drawing, it will be obvious that due to the fact that my hitch it rockably mounted with respect to the forward end of the trailer and extends beneath the latter, with a ground engaging caster wheel secured to the rear end of the hitch frame, that the weight of the forward portion of the trailer is equally distributed between the towing vehicle and the caster wheel, and such not only materially relieves the strain on the towing vehicle, but materially reduces the rebound of the trailer and the jerking action that accompanies the same.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A trailer hitch comprising a diamond-shaped frame, a shaft bridging the frame and extending along the transverse axes thereof and beyond the frame to provide trunnions, bearing brackets receiving the trunnions therein, U-shaped portions included in the bearing brackets for detachable connection to a trailer at the forward end thereof, for a portion of the frame to extend rearwardly beneath the trailer, a ground engaging caster wheel swiveled to the rear apex end of the frame, and clevis means pivotally connected to the front apex of the frame for detachably connecting the hitch to a towing vehicle.

COLEMAN E. CALLAWAY.